(12) United States Patent
Chen

(10) Patent No.: US 8,794,654 B1
(45) Date of Patent: Aug. 5, 2014

(54) FOLDING BALANCE BIKE

(71) Applicant: Wang-Chuan Chen, Taichung (TW)

(72) Inventor: Wang-Chuan Chen, Taichung (TW)

( * ) Notice: Subject to any disclaimer, the term of this patent is extended or adjusted under 35 U.S.C. 154(b) by 0 days.

(21) Appl. No.: 13/853,115

(22) Filed: Mar. 29, 2013

(51) Int. Cl.
*B62K 1/00* (2006.01)

(52) U.S. Cl.
USPC .......................................... 280/287; 280/278

(58) Field of Classification Search
USPC .............. 280/278, 279, 274, 276, 281.1, 231, 280/287–288
See application file for complete search history.

(56) References Cited

U.S. PATENT DOCUMENTS 4,634,138 A * 1/1987 Fryer et al. ..................... 280/278
7,229,089 B2 * 6/2007 Mihelic ......................... 280/278

* cited by examiner

*Primary Examiner* — John Walters
*Assistant Examiner* — James Triggs
(74) *Attorney, Agent, or Firm* — Alan Kamrath; Kamrath IP Lawfirm, P.A.

(57) ABSTRACT

A folding balance bike includes a frame, a front wheel assembly pivotally mounted on one end of the frame, and a rear wheel assembly pivotally mounted on the other end of the frame opposite to the front wheel assembly. The front wheel assembly is pivotable with respect to the frame to steer the folding balance bike. The rear wheel assembly is pivotable with respect to and able to be received into the frame to adjust a wheelbase of the folding balance bike to cause the folding balance bike to be operable between an operative state and a stored state.

9 Claims, 9 Drawing Sheets

FOLDING BALANCE BIKE

BACKGROUND OF THE INVENTION

1. Field of the Invention

The present invention relates to a balance bike and, more particularly, a balance bike foldable into a compact form, facilitating transport and storage.

2. Description of the Related Art

A balance bike is a training bicycle built without any pedals, crankset and chain. The balance bike helps children learn to balance, steer, walk, glide, and push themselves forward thereon without worrying about pedaling. To function properly, the balance bike must be small enough that a child can walk the balance bike while sitting comfortably in a saddle of the balance bike and while putting both feet flat on the ground. Thus, the child first walks the balance bike while standing over the saddle and, then, while sitting in the saddle. Eventually, the child feels comfortable enough to run and scoot while riding the balance bike and, then, to lift both feet off the ground and cruise while balancing on two wheels of the balance bike.

Further, the conventional balance bike has a fixed wheelbase defined between centers of front and rear wheels thereof to cause the balance bike to be inconvenient for the user and inefficient for storage and transport. Moreover, the conventional balance bike has a fixed seat height defined from the saddle to the ground. However, the fixed seat height can not be adjusted to accommodate the child's growth.

Thus, a need exists for a novel balance bike that mitigates and/or obviates the above disadvantages.

SUMMARY OF THE INVENTION

The present invention solves this need and other problems in the field of balance bikes by providing a folding balance bike including a frame, a front wheel assembly pivotally mounted on one end of the frame, and a rear wheel assembly pivotally mounted on the other end of the frame opposite to the front wheel assembly. The frame includes a body portion, a groove extending through the body portion, and a saddle connected with the body portion. The front wheel assembly includes a front wheel. The rear wheel assembly includes a rear wheel rotatably mounted therein.

The rear wheel assembly is pivotable with respect to and able to be received into the groove of the frame to adjust a wheelbase of the folding balance bike to cause the folding balance bike to be operable between an operative state and a stored state, with the wheelbase defined as a horizontal distance extending between centers of front and rear wheels.

When the folding balance bike is in the operative state, the rear wheel of the rear wheel assembly is exposed from and securely disposed at the other end of the frame.

When the folding balance bike is in the stored state, the rear wheel of the rear wheel assembly is received in the groove of the frame.

The wheelbase of the folding balance bike arranged in the stored state is shorter than that arranged in the operative state to facilitate transport and storage.

Preferably, the body portion includes a locking hole extending therethrough. The rear wheel assembly includes the rear wheel rotatably mounted on a distal end of a swing fork thereof. The swing fork includes a connecting portion and two arm portions respectively extended from two sides of the connecting portion. A plurality of locking apertures extends through the connecting portion. One of the plurality of locking apertures is able to be aligned and interconnected with the locking hole of the body portion. A first fastening assembly is engageable into one of the plurality of locking apertures of the swing fork and the locking hole of the body portion to cause the rear wheel assembly to be selectively fixed with respect to the frame.

In a preferred form, a slot is formed at one distal end of the body portion opposite to the saddle, with the connecting portion of the swing fork engaged into the slot of the body portion.

Moreover, the body portion includes a pivoting hole extending therethrough and interconnecting with the slot thereof. The swing fork includes first and second pivoting apertures respectively extending through two opposite ends of each of the two arm portions thereof, with two second fastening assemblies respectively engaged into the first pivoting aperture of the swing fork and the pivoting hole of the body portion and engaged into the second pivoting aperture of the swing fork.

In particular, the body portion defines front, middle, and rear sections thereof. The front section of the body portion is pivotally connected with the front wheel assembly, with the middle section of the body portion extended between the front and rear sections and spaced out into two parts by the groove, and with the rear section of the body portion pivotally connected with the rear wheel assembly and connected with the saddle.

In a preferred form, the front wheel assembly includes the front wheel rotatably mounted in a fork pivotally mounted on the front section of the body portion and connected with and controlled by a handlebar adapted to be gripped and pivoted with respect to the frame by a user to steer the folding balance bike.

A seat height is defined as a vertical distance extending from the saddle of the frame to a horizontal plane. The body portion further includes a plurality of adjusting bores longitudinally arranged and extending through a distal end thereof opposite to the rear wheel assembly, with another first fastening assembly engageable through the saddle and one of the plurality of adjusting bores to cause the saddle to be selectively connected with the frame.

When the first fastening assembly is disengaged from the saddle and one of the plurality of adjusting bores, the saddle is enabled to move in relation to the body portion, with the first fastening assembly able to be reengaged into another of the plurality of adjusting bores and the saddle to adjust the seat height.

Preferably, each of the two first fastening assemblies includes a first fastener and a first retainer selectively engaged with the first fastener. Each of the two second fastening assemblies includes a second fastener and a second retainer engaged with the second fastener.

It is an object of the present invention to provide a folding balance bike able to adjust a wheelbase between the operative state and the stored state to facilitate transport and storage.

It is another object of the present invention to provide a folding balance bike able to adjust a seat height to be suitable for various size requirements.

Other objects, advantages, and new features of the present invention will become apparent from the following detailed description of the invention when considered in conjunction with the accompanied drawings.

BRIEF DESCRIPTION OF THE DRAWINGS

The illustrative embodiments may best be described by reference to the accompanying drawings where.

Figure 1:
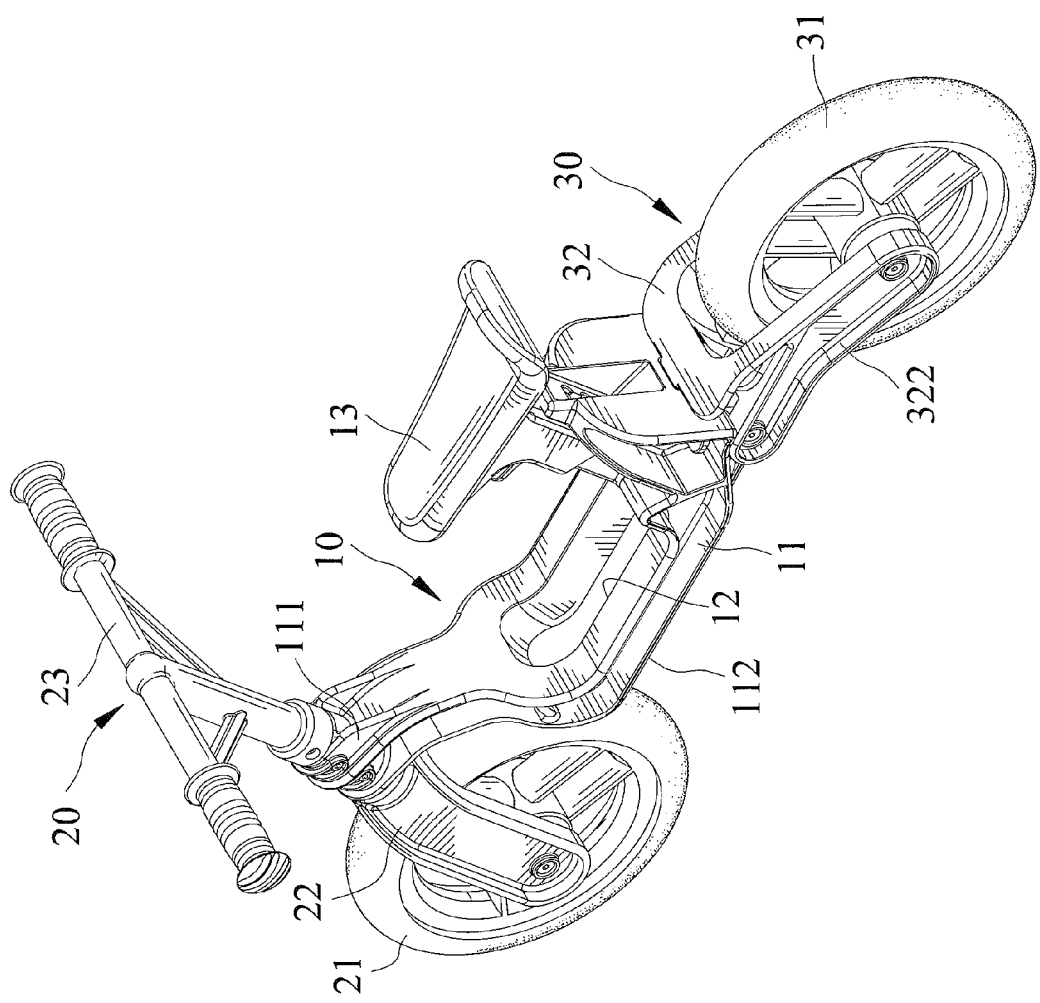
FIG. 1 shows a perspective view of a folding balance bike according to the present invention.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
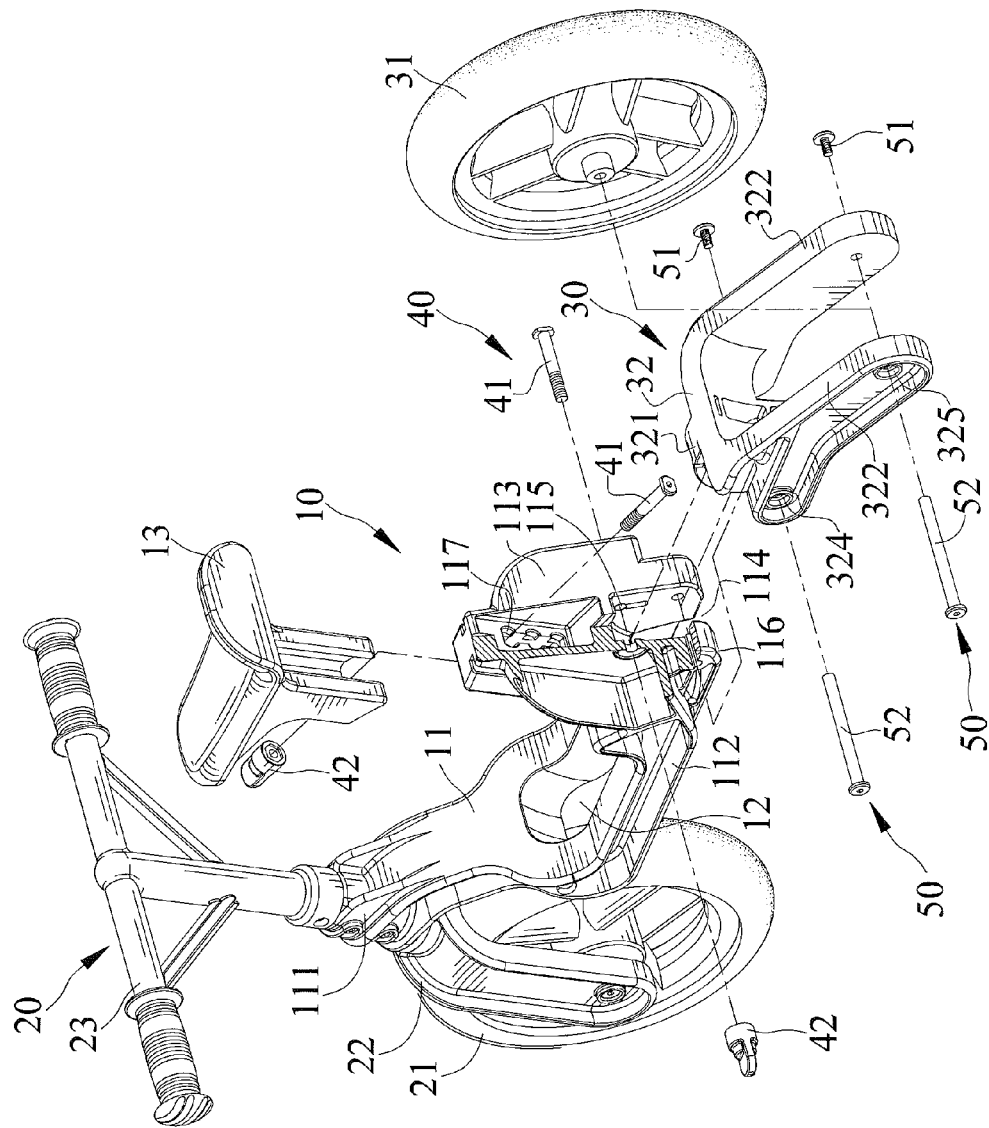
FIG. 2 shows a partial exploded, perspective view of the folding balance bike of FIG. 1.
Figure 3:
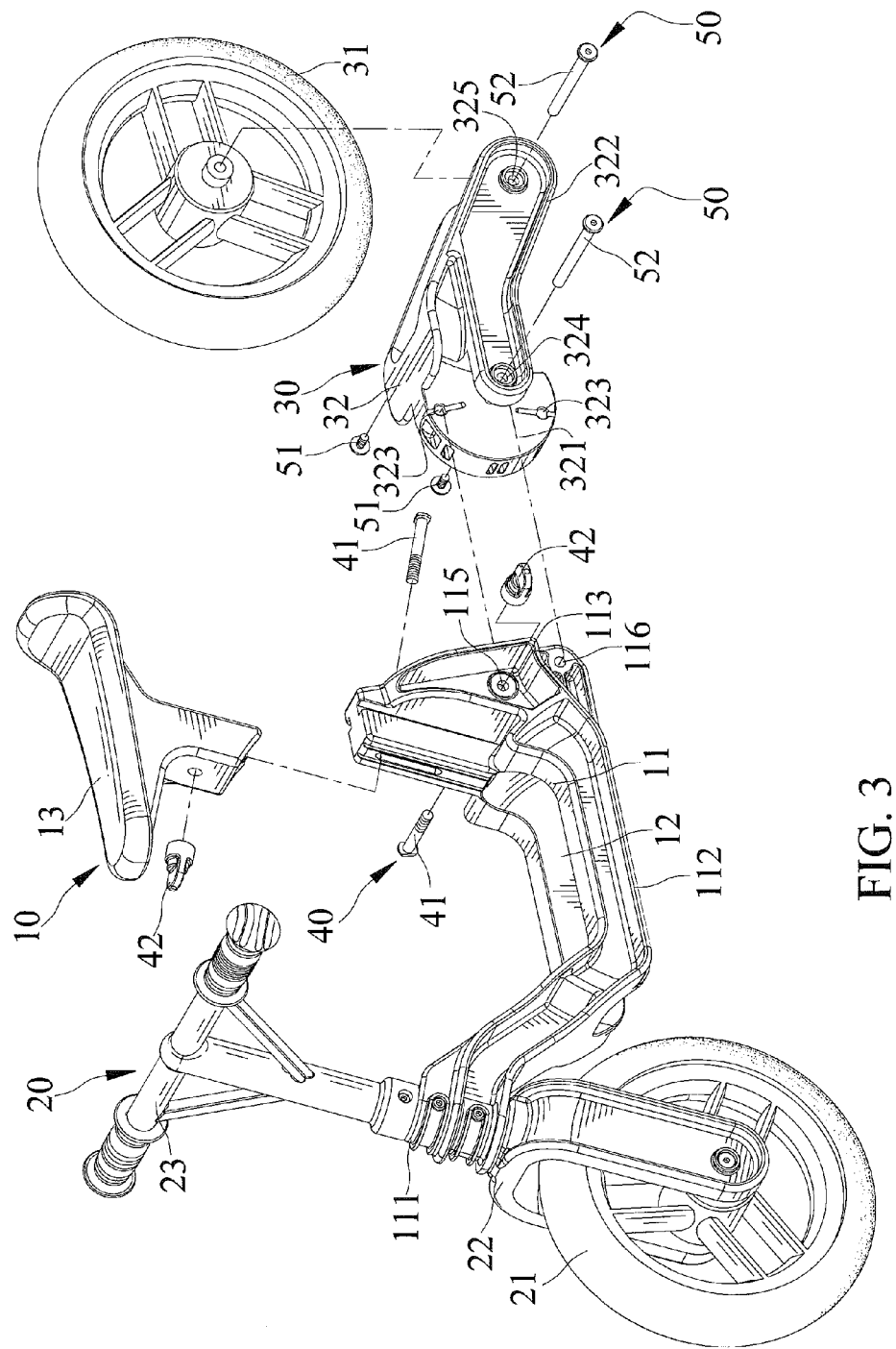
FIG. 3 shows another partial exploded, perspective view of the folding balance bike of FIG. 1.
Figure 4:
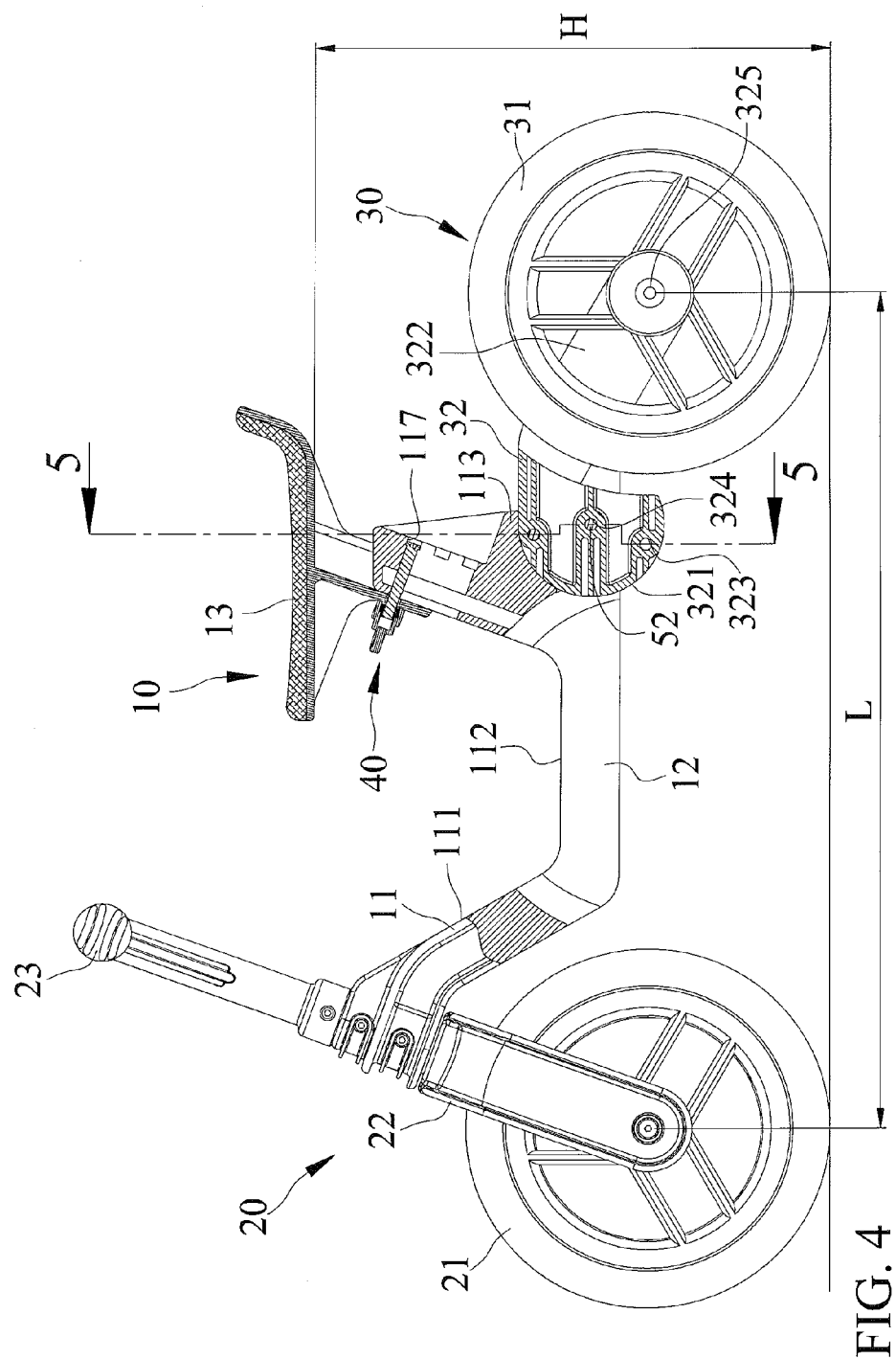
FIG. 4 shows a partial cross-sectional view of the folding balance bike shown in FIG. 1.
Figure 5:
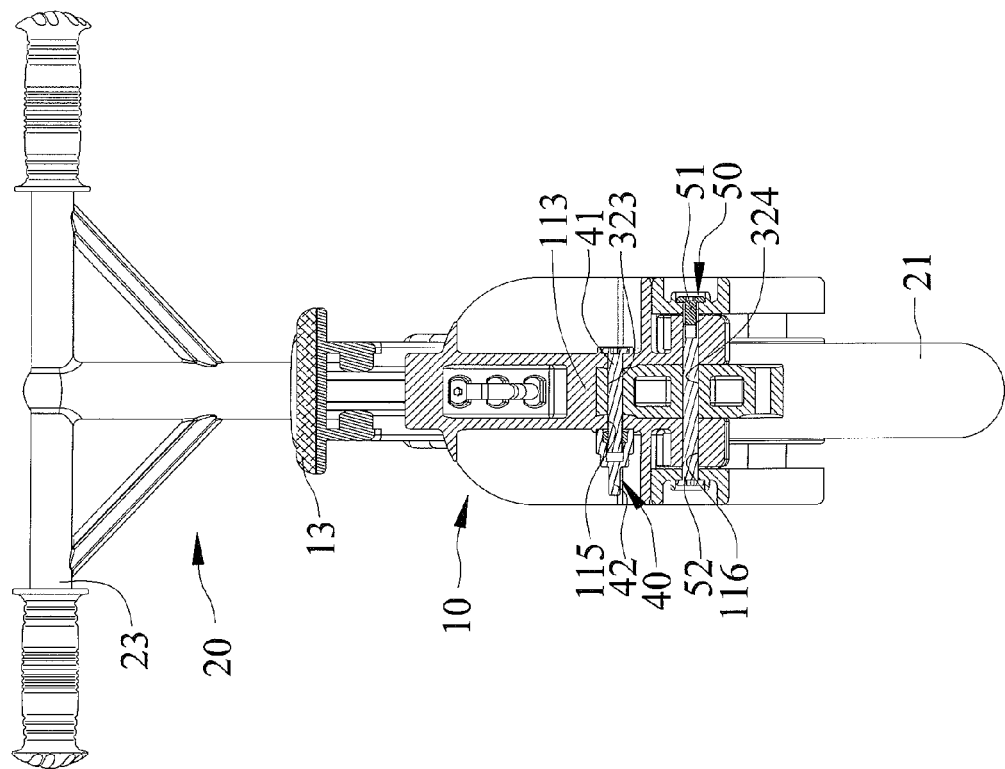
FIG. 5 shows a cross-sectional view taken along line 5-5 of FIG. 4.
Figure 6:
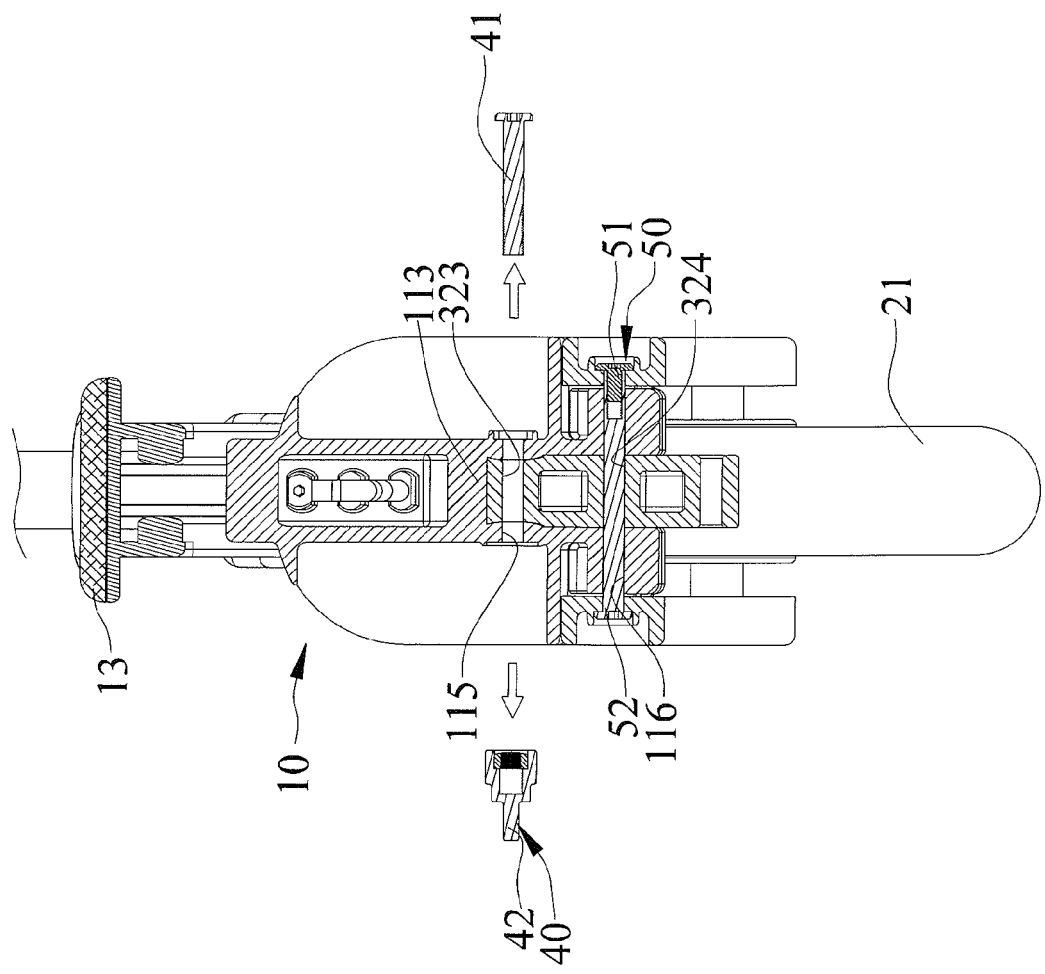
FIG. 6 shows a partial, continued view of the folding balance bike shown in FIG. 5, and illustrates a first restrainer disengaged from a first fastener.
Figure 7:
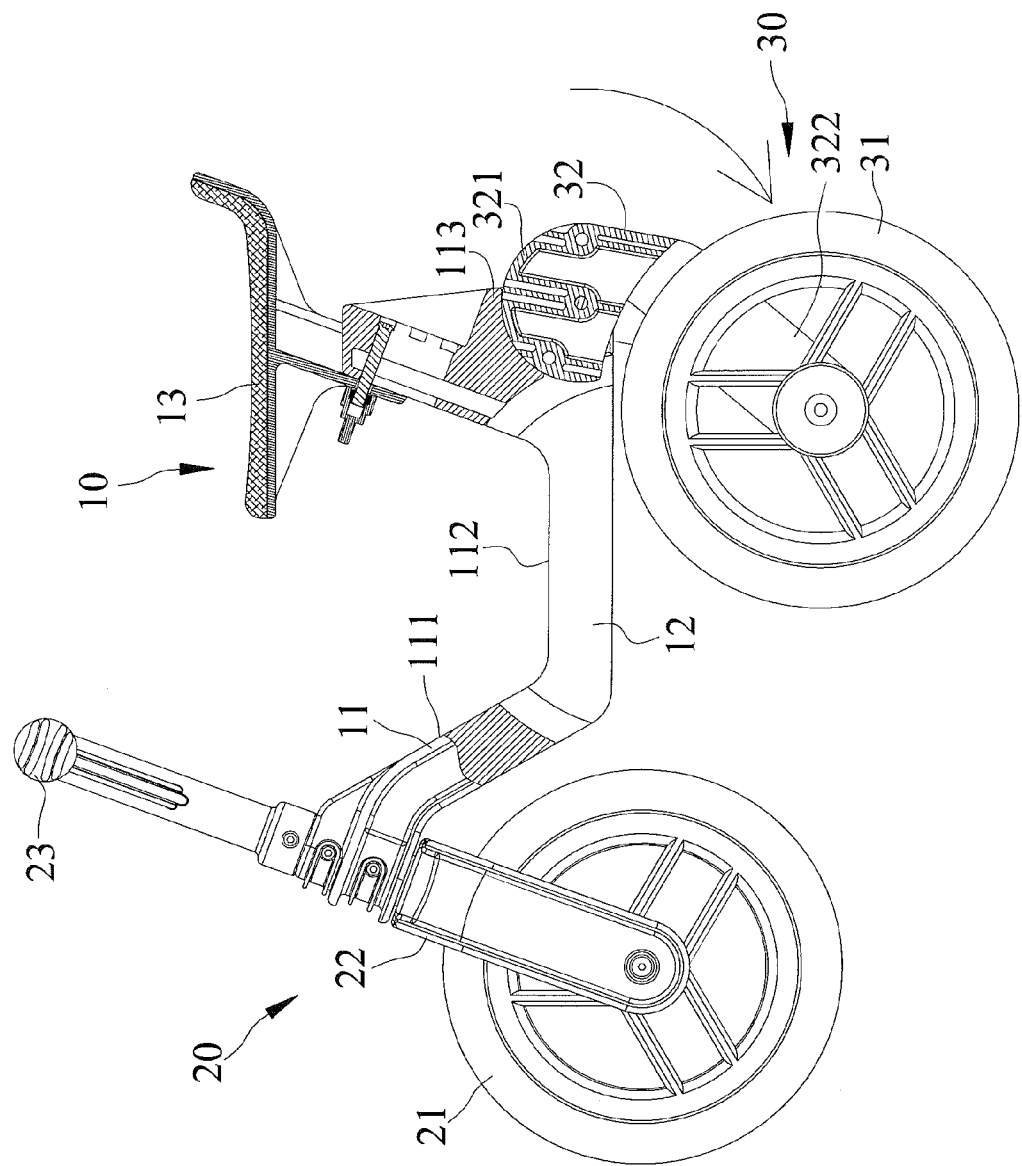
FIG. 7 shows a continued view of the folding balance bike shown in FIG. 4, and illustrates a rear wheel assembly pivoted with respect to a frame.
Figure 8:
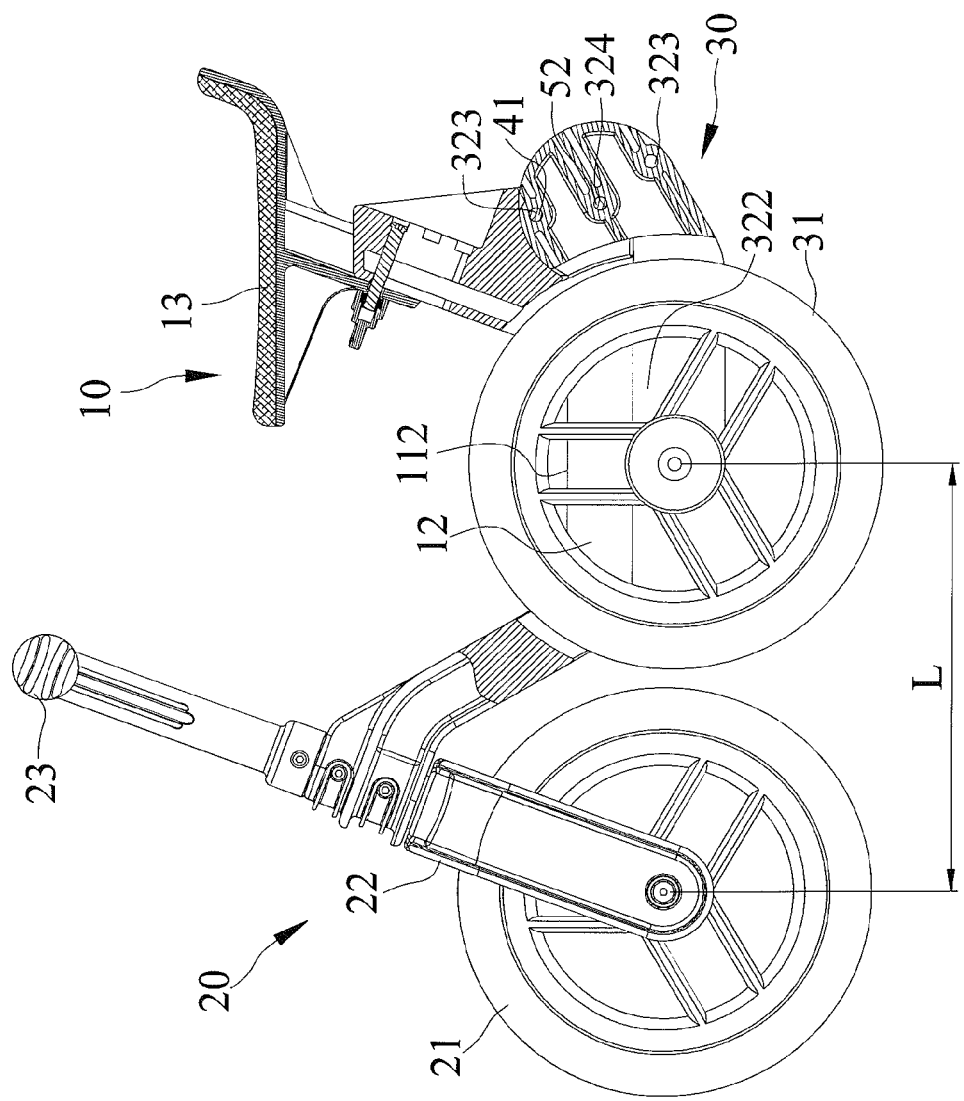
FIG. 8 shows a continued view of the folding balance bike shown in FIG. 7, and illustrates a rear wheel of the rear wheel assembly received into the frame.
Figure 9:
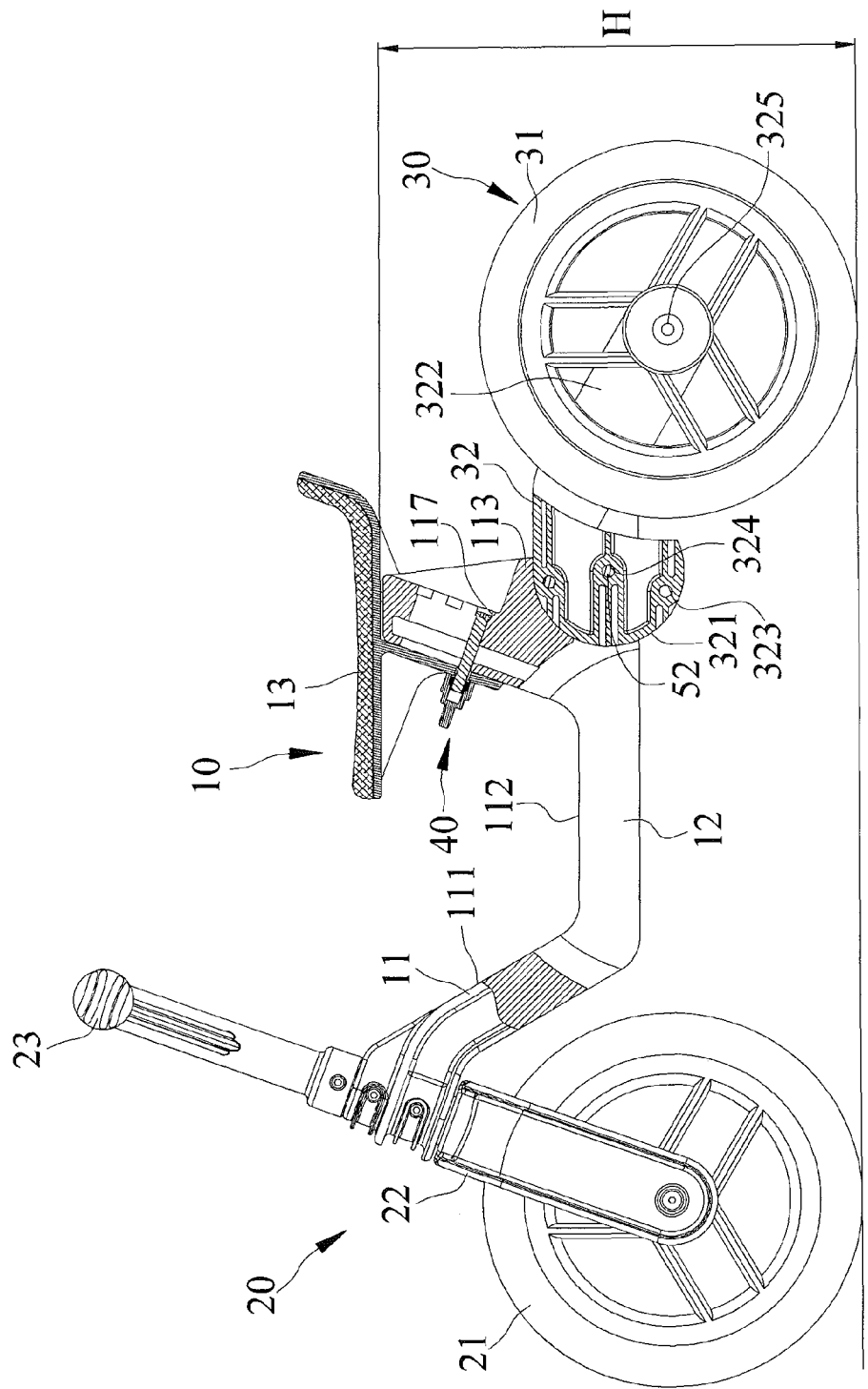
FIG. 9 shows a continued view of the folding balance bike shown in FIG. 4, and illustrates a saddle adjusted with respect to the frame.

FIGS. 1 through 9 show a folding balance bike according to the present invention. The folding balance bike includes a frame 10, a front wheel assembly 20 pivotally mounted on one end of the frame 10, and a rear wheel assembly 30 pivotally mounted on the other end of the frame 10 opposite to the front wheel assembly 20. The front wheel assembly 20 is pivotable with respect to the frame 10 to steer the folding balance bike. The rear wheel assembly 30 is pivotable with respect to and is able to be received into the frame 10 to adjust a wheelbase L of the folding balance bike to cause the folding balance bike to be operable between an operative state and a stored state. The wheelbase L is defined as a horizontal distance extending between centers of front and rear wheels 21 and 31 respectively rotatably mounted in the front and rear wheel assemblies 20 and 30. When the folding balance bike is in the operative state, the rear wheel 31 of the rear wheel assembly 30 is exposed from and securely disposed at the other end of the frame 10. When the folding balance bike is in the stored state, the rear wheel 31 of the rear wheel assembly 30 is received in the frame 10. In particular, the wheelbase L of the folding balance bike arranged in the stored state is shorter than that arranged in the operative state to facilitate transport and storage.

The frame 10 includes a body portion 11 and a groove 12 extending through the body portion 11 and disposed between the front and rear wheel assemblies 20 and 30. The body portion 11 defines front, middle, and rear sections 111, 112, and 113 thereof. The front section 111 of the body portion 11 is pivotally connected with the front wheel assembly 20. The middle section 112 of the body portion 11 is extended between the front and rear sections 111 and 113 and spaced out into two parts by the groove 12. The rear section 113 of the body portion 11 is pivotally connected with the rear wheel assembly 30 and longitudinally extended to connect with a saddle 13 capable of moving relatively to the rear section 113 of the body portion 11. A slot 114 is formed at one distal end of the rear section 113 opposite to the saddle 13. The body portion 11 further includes a locking hole 115 and a pivoting hole 116 extending transversely across the rear section 113 and interconnecting with the slot 114 thereof.

The front wheel assembly 20 includes the front wheel 21 rotatably mounted in a fork 22. The fork 22 is pivotally mounted on the front section 111 of the body portion 11 and connected with and controlled by a handlebar 23 adapted to be gripped and pivoted with respect to the frame 10 by a user to steer the folding balance bike.

The rear wheel assembly 30 includes the rear wheel 31 rotatably mounted on a distal end of a swing fork 32 thereof. The swing fork 32 includes a connecting portion 321 and two arm portions 322 respectively extended from two sides of the connecting portion 321. The connecting portion 321 of the swing fork 32 is engaged into the slot 114 of the body portion 11. The swing fork 32 further includes a plurality of locking apertures 323 extending transversely through two opposite side walls of the connecting portion 321 thereof, and first and second pivoting apertures 324 and 325 respectively extending transversely through two opposite ends of each of the two arm portions 322 thereof. In particular, the plurality of locking apertures 323 include two locking apertures 323 respectively arranged at two longitudinal opposite ends of the connecting portion 321. One of the two locking apertures 323 can be aligned and interconnected with the locking hole 115 of the body portion 11 of the frame 10, when the rear wheel assembly 30 is pivoted with respect to the frame 10. In particular, the first pivoting aperture 324 is extended through one end of each of the two arm portions 322 and the two opposite side walls of the connecting portion 321.

The folding balance bike further includes two first fastening assemblies 40 and two second fastening assemblies 50 mounted therein. Each of the two first fastening assemblies 40 includes a first fastener 41 and a first retainer 42 selectively engaged with the first fastener 41. One of the two first fastening assemblies 40 is engageable into one of the two locking apertures 323 of the swing fork 32 of the rear wheel assembly 30 and the locking hole 115 of the body portion 11 of the frame 10 to cause the rear wheel assembly 30 to be selectively fixed with respect to the frame 10. Thus, the rear wheel 31 is selectively received into the groove 12 of the frame 10 to cause the folding balance bike to be operable between the operative state and the stored state. Each of the two second fastening assemblies 50 includes a second fastener 51 and a second retainer 52 engaged with the second fastener 51. One of the two second fastening assemblies 50 is engaged into the first pivoting aperture 324 of the swing fork 32 of the rear wheel assembly 30 and the pivoting hole 116 of the body portion 11 of the frame 10 to cause the rear wheel assembly 30 to be pivotally connected with the frame 10. The other one of the two second fastening assemblies 50 is engaged into the second pivoting aperture 325 of the swing fork 32 and the rear wheel 31 of the rear wheel assembly 30.

When the folding balance bike is in the operative state, one of the two first fastening assemblies 40 is engaged into one of the two locking apertures 323 of the swing fork 32 of the rear wheel assembly 30 disposed adjacent to the saddle 13 and the locking hole 115 of the body portion 11 of the frame 10 to cause the rear wheel assembly 30 to be securely fixed with respect to the frame 10. Thus, the rear wheel 31 is exposed from and disposed at the other end of the frame 10.

However, the first retainer 42 is disengageable from the first fastener 41 of one of the two first fastening assemblies 40 and separated from one of the two locking apertures 323 of the swing fork 32 of the rear wheel assembly 30 disposed adjacent to the saddle 13 and the locking hole 115 of the body portion 11 of the frame 10 to cause the rear wheel assembly 30 to be pivotable with respect to the frame 10.

Furthermore, the rear wheel assembly 30 is pivoted with respect to the frame 10 to cause the other one of the two locking apertures 323 of the swing fork 32 of the rear wheel assembly 30 to be aligned with the locking hole 115 of the body portion 11 of the frame 10, and the two arm portions 322 of the swing fork 32 are abutted against the two parts of the middle section 112 of the body portion 11.

When the folding balance bike is in the stored state, one of the two first fastening assemblies 40 is reengaged into the other one of the two locking apertures 323 of the swing fork 32 of the rear wheel assembly 30 and the locking hole 115 of the body portion 11 of the frame 10 to cause the rear wheel assembly 30 to be securely fixed with respect to the frame 10. Thus, the rear wheel 31 is received into the groove 12 of the frame 10. Here, the folding balance bike has the wheelbase L shown in FIG. 8 shorter than that of FIG. 4.

Additionally, a seat height H is defined as a vertical distance extending from the saddle 13 of the frame 10 to a horizontal plane, such as the ground when the folding balance bike is oriented perpendicular to the horizontal plane. The body portion 11 further includes a plurality of adjusting bores 117 longitudinally arranged and extending through a distal end of the rear section 113 opposite to the rear wheel assembly 30. The other one of the two first fastening assemblies 40 is engageable through the saddle 13 and one of the plurality of adjusting bores 117 to cause the saddle 13 to be selectively connected with the frame 10. When the other one of the two first fastening assemblies 40 is disengaged from the saddle 13 and one of the plurality of adjusting bores 117, the saddle 13 is enabled to move in relation to the rear section 113 of the body portion 11. Thus, the other one of the two first fastening assemblies 40 is able to be reengaged into another of the plurality of adjusting bores 117 and the saddle 13 to adjust the seat height H to be suitable for various size requirements. Here, the folding balance bike has the seat height H shown in FIG. 9 lower than that of FIG. 4.

The folding balance bike includes the following advantages:

1. The folding balance bike includes a frame 10, a front wheel assembly 20 pivotally mounted on one end of the frame 10, and a rear wheel assembly 30 pivotally mounted on the other end of the frame 10 opposite to the front wheel assembly 20. The front wheel assembly 20 is pivotable with respect to the frame 10 to steer the folding balance bike. The rear wheel assembly 30 is pivotable with respect to and able to be received into the frame 10 to adjust a wheelbase L of the folding balance bike to cause the folding balance bike to be operable between an operative state and a stored state. The wheelbase L is defined as a horizontal distance extending between centers of front and rear wheels 21 and 31 respectively rotatably mounted in the front and rear wheel assemblies 20 and 30. When the folding balance bike is in the operative state, the rear wheel 31 of the rear wheel assembly 30 is exposed from and securely disposed at the other end of the frame 10. When the folding balance bike is in the stored state, the rear wheel 31 of the rear wheel assembly 30 is received in the frame 10. In particular, the wheelbase L of the folding balance bike arranged in the stored state is shorter than that arranged in the operative state to facilitate transport and storage.

2. A body portion 11 of the frame 10 includes a plurality of adjusting bores 117 longitudinally arranged and extending through a distal end of the rear section 113 of the body portion 11 opposite to the rear wheel assembly 30. A first fastening assemblies 40 is engageable through a saddle 13 and one of the plurality of adjusting bores 117 to cause the saddle 13 to be selectively connected with the frame 10. When the other one of the two first fastening assemblies 40 is disengaged from the saddle 13 and one of the plurality of adjusting bores 117, the saddle 13 is enabled to move in relation to the rear section 113 of the body portion 11. Thus, the first fastening assemblies 40 is able to be reengaged into another of the plurality of adjusting bores 117 and the saddle 13 to adjust the seat height H to be suitable for various size requirements.

Now that the basic teachings of the folding balance bike have been explained, many extensions and variations will be obvious to one having ordinary skill in the art. For example, the frame 10, and the front and rear wheel assemblies 20 and 30 can have shapes different from those shown in the figures.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A folding balance bike comprising:
   a frame including a body portion, a groove extending through the body portion, and a saddle connected with the body portion;
   a front wheel assembly pivotally mounted on one end of the frame, with the front wheel assembly including a front wheel; and
   a rear wheel assembly pivotally mounted on another end of the frame opposite to the front wheel assembly, with the rear wheel assembly including a rear wheel rotatably mounted therein;
   wherein the rear wheel assembly is pivotable with respect to and receivable into the groove of the frame to adjust a wheelbase of the folding balance bike to cause the folding balance bike to be operable between an operative state and a stored state, with the wheelbase defined as a horizontal distance extending between centers of the front and rear wheels;
   wherein when the folding balance bike is in the operative state, the rear wheel of the rear wheel assembly is exposed from and securely disposed at the other end of the frame;
   wherein when the folding balance bike is in the stored state, the rear wheel of the rear wheel assembly is received in the groove of the frame;
   wherein the wheelbase of the folding balance bike arranged in the stored state is shorter than that arranged in the operative state to facilitate transport and storage; and wherein the body portion includes a locking hole extending therethrough, with the rear wheel assembly including the rear wheel rotatably mounted on a distal end of a swing fork thereof, with the swing fork including a connecting portion and two arm portions respectively extended from two sides of the connecting portion, with a plurality of locking apertures extending through the connecting portion, with one of the plurality of locking apertures able to be aligned and interconnected with the locking hole of the body portion, with a first fastening assembly engageable into one of the plurality of locking apertures of the swing fork and the locking hole of the body portion to cause the rear wheel assembly to be selectively fixed with respect to the frame.

2. The folding balance bike as claimed in claim 1, wherein a slot is formed at one distal end of the body portion opposite to the saddle, with the connecting portion of the swing fork engaged into the slot of the body portion.

3. The folding balance bike as claimed in claim 2, wherein the body portion includes a pivoting hole extending therethrough and interconnecting with the slot thereof, with the swing fork including first and second pivoting apertures respectively extending through two opposite ends of each of the two arm portions thereof, and with two second fastening assemblies respectively engaged into the first pivoting aperture of the swing fork and the pivoting hole of the body portion and engaged into the second pivoting aperture of the swing fork.

4. The folding balance bike as claimed in claim 1, wherein the body portion defines front, middle, and rear sections thereof, with the front section of the body portion pivotally connected with the front wheel assembly, with the middle section of the body portion extended between the front and rear sections and spaced out into two parts by the groove, with the rear section of the body portion pivotally connected with the rear wheel assembly and connected with the saddle.

5. The folding balance bike as claimed in claim 4, wherein the front wheel assembly includes the front wheel rotatably mounted in a fork pivotally mounted on the front section of the body portion and connected with and controlled by a handlebar adapted to be gripped and pivoted with respect to the frame by a user to steer the folding balance bike.

6. The folding balance bike as claimed in claim 4, wherein when the folding balance bike is in the stored state, the two arm portions of the swing fork are abutted against the two parts of the middle section of the body portion.

7. The folding balance bike as claimed in claim 3, wherein the first fastening assembly includes a first fastener and a first retainer selectively engaged with the first fastener, wherein each of the two second fastening assemblies includes a second fastener and a second retainer engaged with the second fastener.

8. The folding balance bike as claimed in claim 1, wherein a seat height is defined as a vertical distance extending from the saddle of the frame to a horizontal plane, and wherein the body portion further includes a plurality of adjusting bores longitudinally arranged and extending through a distal end thereof opposite to the rear wheel assembly, with a fastening assembly engageable through the saddle and one of the plurality of adjusting bores to cause the saddle to be selectively connected with the frame.

9. A folding balance bike comprising:
a frame including a body portion, a groove extending through the body portion, and a saddle connected with the body portion;
a front wheel assembly pivotally mounted on one end of the frame, with the front wheel assembly including a front wheel; and
a rear wheel assembly pivotally mounted on another end of the frame opposite to the front wheel assembly, with the rear wheel assembly including a rear wheel rotatably mounted therein;
wherein the rear wheel assembly is pivotable with respect to and receivable into the groove of the frame to adjust a wheelbase of the folding balance bike to cause the folding balance bike to be operable between an operative state and a stored state, with the wheelbase defined as a horizontal distance extending between centers of the front and rear wheels;
wherein when the folding balance bike is in the operative state, the rear wheel of the rear wheel assembly is exposed from and securely disposed at the other end of the frame;
wherein when the folding balance bike is in the stored state, the rear wheel of the rear wheel assembly is received in the groove of the frame; and
wherein the wheelbase of the folding balance bike arranged in the stored state is shorter than that arranged in the operative state to facilitate transport and storage;
wherein a seat height is defined as a vertical distance extending from the saddle of the frame to a horizontal plane, wherein the body portion further includes a plurality of adjusting bores longitudinally arranged and extending through a distal end thereof opposite to the rear wheel assembly, with a fastening assembly engageable through the saddle and one of the plurality of adjusting bores to cause the saddle to be selectively connected with the frame; and
wherein when the fastening assembly is disengaged from the saddle and one of the plurality of adjusting bores, the saddle is enabled to move in relation to the body portion, with the fastening assembly able to be reengaged into another of the plurality of adjusting bores and the saddle to adjust the seat height.

\* \* \* \* \*